US010128500B2

(12) United States Patent
Huang et al.

(10) Patent No.: US 10,128,500 B2
(45) Date of Patent: Nov. 13, 2018

(54) PREPARATION METHOD OF LITHIUM NICKEL MANGANESE OXIDE CATHODE MATERIAL OF BATTERY AND LITHIUM NICKEL MANGANESE OXIDE CATHODE MATERIAL OF BATTERY

(71) Applicant: ADVANCED LITHIUM ELECTROCHEMISTRY CO., LTD., Taoyuan (TW)

(72) Inventors: Chun-Ming Huang, Taoyuan (TW); Han-Wei Hsieh, Taoyuan (TW); Hsiang-Pin Lin, Taoyuan (TW)

(73) Assignee: ADVANCED LITHIUM ELECTROCHEMISTRY CO., LTD., Taoyuan (TW)

( * ) Notice: Subject to any disclaimer, the term of this patent is extended or adjusted under 35 U.S.C. 154(b) by 37 days.

(21) Appl. No.: 15/328,587

(22) PCT Filed: Jul. 23, 2015

(86) PCT No.: PCT/CN2015/084909
§ 371 (c)(1),
(2) Date: Jan. 24, 2017

(87) PCT Pub. No.: WO2016/011963
PCT Pub. Date: Jan. 28, 2016

(65) Prior Publication Data
US 2017/0207452 A1    Jul. 20, 2017

Related U.S. Application Data

(60) Provisional application No. 62/029,146, filed on Jul. 25, 2014.

(51) Int. Cl.
*H01M 4/505* (2010.01)
*C01G 53/00* (2006.01)
(Continued)

(52) U.S. Cl.
CPC .......... *H01M 4/505* (2013.01); *C01G 53/52* (2013.01); *C01G 53/54* (2013.01); *H01M 4/131* (2013.01);
(Continued)

(58) Field of Classification Search
CPC ..................................... C01G 53/54
See application file for complete search history.

(56) References Cited

U.S. PATENT DOCUMENTS 5,869,208 A * 2/1999 Miyasaka ............. H01M 4/131
429/215
6,080,510 A * 6/2000 Hemmer ............... C01B 13/185
423/594.2
(Continued)

FOREIGN PATENT DOCUMENTS

CN    1476117 A    2/2004
CN    102324513 A    1/2012
(Continued)

OTHER PUBLICATIONS

C.Q. Liu, et al., Spinel LiNi0.5 Mn1.5 O4 and its derivatives as cathodes for high-voltage Li-ion batteries, Journal of Solid State Electrochemistry, vol. 14, No. 12, Apr. 16, 2010.

*Primary Examiner* — Peter F Godenschwager
(74) *Attorney, Agent, or Firm* — Kirton McConkie; Evan R. Witt (57) ABSTRACT

A preparation method of a lithium nickel manganese oxide cathode material of a battery includes steps of providing a nickel compound, a manganese compound, a first quantity of lithium compound, a second quantity of lithium compound and a compound containing metallic ions, mixing the nickel compound, the first quantity of lithium compound, dispersant and deionized water to produce first product solution, adding the manganese compound into the first product solution and mixing to produce second product solution,
(Continued)

performing a first grinding to produce first precursor solution, mixing the second quantity of lithium compound, the compound containing the metallic ions and the first precursor solution, then performing a second grinding to produce second precursor solution, and calcining the second precursor solution to produce the lithium nickel manganese oxide cathode material of the battery, the formula of which is written by $Li_{1.0+x}Ni_{0.5}Mn_{1.5}M_yO_4$. Therefore, the activation energy of reaction can be reduced.

8 Claims, 9 Drawing Sheets

(51) Int. Cl.
*H01M 4/1391* (2010.01)
*H01M 4/131* (2010.01)
*H01M 4/525* (2010.01)

(52) U.S. Cl.
CPC ......... *H01M 4/1391* (2013.01); *H01M 4/525* (2013.01); *C01P 2002/88* (2013.01); *C01P 2004/03* (2013.01); *C01P 2006/11* (2013.01); *C01P 2006/40* (2013.01)

(56) References Cited

U.S. PATENT DOCUMENTS

| | | | |
|---|---|---|---|
| 6,168,888 B1 * | 1/2001 | Iwata | C01G 45/1242 252/182.1 |
| 6,274,278 B1 * | 8/2001 | Pistoia | C01G 45/1242 429/224 |

FOREIGN PATENT DOCUMENTS

| | | |
|---|---|---|
| CN | 102683668 A | 9/2012 |
| CN | 102820464 A | 12/2012 |
| CN | 102969494 A | 3/2013 |
| CN | 103904319 A | 7/2014 |
| FR | 2879822 A1 | 6/2006 |
| JP | 2004155631 A | 6/2004 |
| JP | 2010282858 A | 12/2010 |

* cited by examiner

FIG. 9

PREPARATION METHOD OF LITHIUM NICKEL MANGANESE OXIDE CATHODE MATERIAL OF BATTERY AND LITHIUM NICKEL MANGANESE OXIDE CATHODE MATERIAL OF BATTERY

TECHNICAL FIELD

The present disclosure relates to a preparation method of a lithium nickel manganese oxide cathode material of a battery and a lithium nickel manganese oxide cathode material of a battery, and more particularly to a preparation method that increases the tap density and the charge capacity per unit weight of the lithium nickel manganese oxide cathode material of a battery prepared by a solid-state reaction by adding metallic ions with valence equals to 2, 3, 4 or 5.

BACKGROUND

With quick development of technology, a lot of electronic products and electricity-driven transports are developed to improve the life function, enhance the efficiency of energy use and reduce the air pollution. Lithium batteries are widely used since they are safe and non-memorized and can be repeatedly used.

In prior art, a lithium compound, a nickel compound and a manganese compound are disclosed to be utilized for preparing a cathode material of a lithium battery. However, the batteries made of the lithium nickel manganese oxide compound prepared through a solid-state reaction cannot satisfy the requirement of power consuming of the electronic products or the electricity-driven transports. Under this circumstance, to increase the total charge capacities of the batteries so as to lengthen the use time of the electronic products and the electricity-driven transports, it is necessary to increase the tap density and the charge capacity per unit weight of the lithium nickel manganese oxide cathode material of a battery.

There is a need of providing a preparation method of a lithium nickel manganese oxide cathode material of a battery and a lithium nickel manganese oxide cathode material of a battery to obviate the drawbacks encountered from the prior art.

BRIEF SUMMARY

It is an object of the present invention to provide a preparation method of a lithium nickel manganese oxide cathode material of a battery and a lithium nickel manganese oxide cathode material of a battery to solve the problems of lower tap density and lower charge capacity per unit weight of a lithium battery made of a lithium nickel manganese oxide compound prepared by a solid-state reaction of prior art.

An object of the present invention provides a preparation method of a lithium nickel manganese oxide cathode material of a battery and a lithium nickel manganese oxide cathode material of a battery. By adding a compound containing metallic ions with valence equals to 2, 3, 4 or 5 into a solid-state reaction to produce primary particles, which are product powders having octahedral structures, the charge capacity per unit weight and the tap density of the lithium nickel manganese oxide cathode material of the battery can be increased, and the activation energy of reaction can be reduced in the thermal treatment stage while preparing the lithium nickel manganese oxide compound through a solid-state reaction.

In accordance with an aspect of the present disclosure, there is provided a preparation method of a lithium nickel manganese oxide cathode material of a battery. The preparation method includes steps of (a) providing a nickel compound, a manganese compound, a first quantity of lithium compound, a second quantity of lithium compound, and a compound containing metallic ions with valence equals to 2, 3, 4 or 5, (b) mixing and stirring the nickel compound, the first quantity of lithium compound, dispersant and deionized water for a first time period to produce first product solution, (c) adding the manganese compound into the first product solution and then mixing and stirring for a second time period to produce second product solution, (d) performing a first grinding on the second product solution to produce first precursor solution, (e) mixing and stirring the second quantity of lithium compound, the compound containing the metallic ions with valence equals to 2, 3, 4 or 5, and the first precursor solution for a third time period, and then performing a second grinding, to produce second precursor solution, and (f) calcining the second precursor solution to produce the lithium nickel manganese oxide cathode material of the battery. The formula of the lithium nickel manganese oxide cathode material of the battery is written by $Li_{1.0+x}Ni_{0.5}Mn_{1.5}M_yO_4$. M represents the metallic ions with valence equals to 2, 3, 4 or 5, x is greater than or equal to −0.1 and less than or equal to 0.1, and y is greater than 0 and less than or equal to 0.08.

In accordance with another aspect of the present disclosure, there is provided a lithium nickel manganese oxide cathode material, the formula of which is written by $Li_{1.0+x}Ni_{0.5}Mn_{1.5}V_yO_4$. V represents the vanadium, x is greater than or equal to −0.1 and less than or equal to 0.1, and y is greater than 0 and less than or equal to 0.08.

In accordance with another aspect of the present disclosure, there is provided a preparation method of a lithium nickel manganese oxide cathode material of a battery. The preparation method includes steps of (a) providing a nickel compound, a manganese compound, a lithium compound, and a compound containing metallic ions with valence equals to 2, 3, 4 or 5, (b) mixing and stirring the nickel compound, the lithium compound, dispersant and deionized water for a first time period to produce first product solution, (c) adding the manganese compound and the compound containing the metallic ions with valence equals to 2, 3, 4 or 5 into the first product solution and then mixing and stirring for a second time period to produce second product solution, (d) performing a grinding on the second product solution to produce precursor solution, and (e) calcining the precursor solution to produce the lithium nickel manganese oxide cathode material of the battery. The formula of the lithium nickel manganese oxide cathode material of the battery is written by $Li_{1.0+4x}Ni_{0.5}Mn_{1.5-4x}M_xO_4$. M represents the metallic ions with valence equals to 2, 3, 4 or 5, and x is greater than 0 and less than or equal to 0.1.

In accordance with still another aspect of the present disclosure, there is provided a lithium nickel manganese oxide cathode material, the formula of which is written by $Li_{1.0+4x}Ni_{0.5}Mn_{1.5-4x}V_xO_4$, wherein V represents the vanadium, and x is greater than 0 and less than or equal to 0.1

The above contents of the present disclosure will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
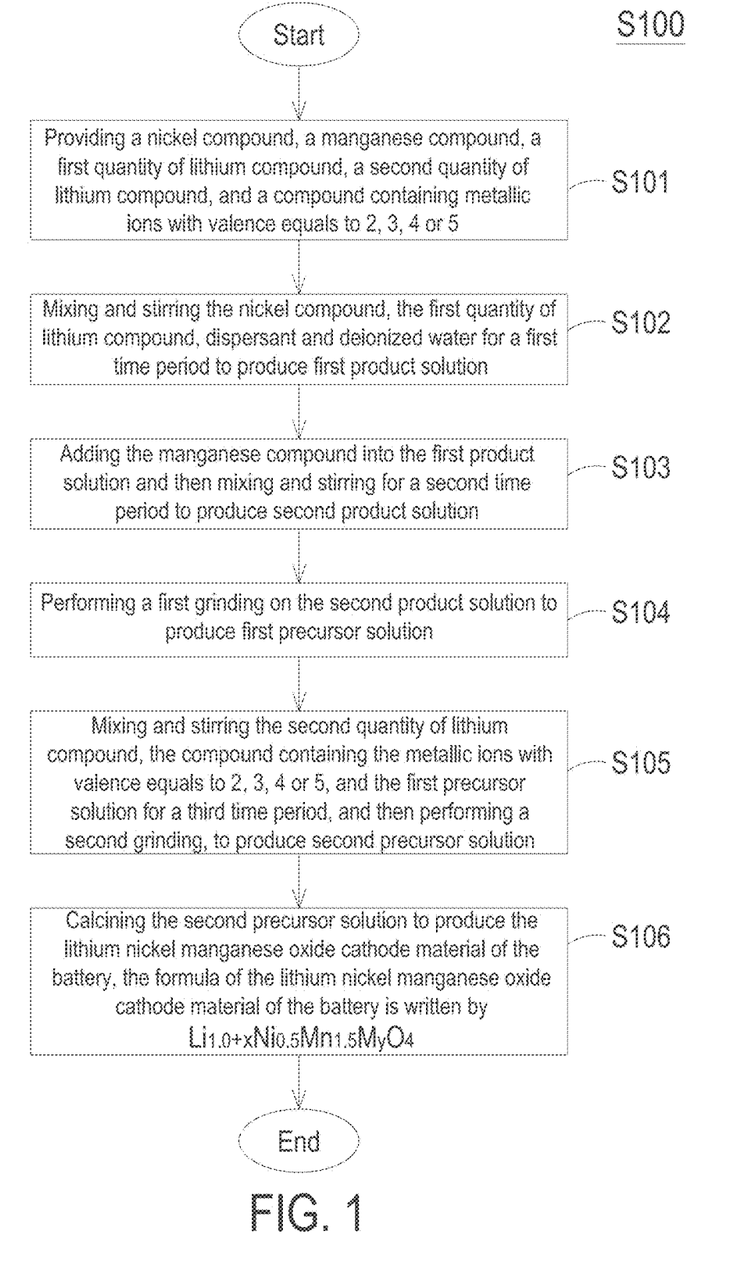
FIG. 1 schematically illustrates the flow chart of a first preparation method of a lithium nickel manganese oxide cathode material of a battery of the present invention.

Please refer to FIG. 1. FIG. 1 schematically illustrates the flow chart of a first preparation method of a lithium nickel manganese oxide cathode material of a battery of the present invention. As shown in FIG. 1, a first preparation method S100 of a lithium nickel manganese oxide cathode material of a battery of the present invention includes steps as follows. At first, as shown in step S101, providing a nickel compound, a manganese compound, a first quantity of lithium compound, a second quantity of lithium compound, and a compound containing metallic ions with valence equals to 2, 3, 4 or 5. In this embodiment, the compound containing metallic ions with valence equals to 2, 3, 4 or 5 is not limited to a vanadium compound, a niobium compound, a manganese compound or a antimony compound, and is preferred to be a vanadium compound.

In some embodiments, the nickel compound can be selected from the group consisting of NiO and $NiCO_3$. In some embodiments, the manganese compound can be selected from the group consisting of $Mn_2O_3$, MnO, $MnCO_3$ and $Mn_2(CO_3)_3$, but not limited herein. In some embodiments, each of the first quantity of lithium compound and the second quantity of lithium compound is selected from the group consisting of LiOH and $Li_2CO_3$, and the first quantity of lithium compound and the second quantity of lithium compound are the same compound or different compounds. In some embodiments, the metallic ions with valence equals to 2, 3, 4 or 5 are selected from the group consisting of $Mn_2O_3$, MnO, $MnCO_3$, $Mn_2(CO_3)_3$ and $V_2O_5$, but not limited herein.

Next, as shown in step S102, mixing and stirring the nickel compound, the first quantity of lithium compound, dispersant and deionized water for a first time period to produce first product solution. In this embodiment, the first time period required for mixing and stirring is preferred to be 10 minutes, but not limited herein.

Then, as shown in step S103, adding the manganese compound into the first product solution and then mixing and stirring for a second time period to produce second product solution. In this embodiment, the second time period required for mixing and stirring is preferred to be 10 minutes, but not limited herein.

Next, as shown in step S104, performing a first grinding on the second product solution to produce first precursor solution. In this embodiment, in order to make all the components in the second product solution completely reacted, the second product solution is put into a ball mill for grinding at 450-650 rpm for 2-3 hours, thereby completing the first grinding so as to produce the first precursor solution. The first precursor solution contains precursor of the lithium nickel manganese oxide compound.

Then, as shown in step S105, mixing and stirring the second quantity of lithium compound, the compound containing the metallic ions with valence equals to 2, 3, 4 or 5, and the first precursor solution for a third time period, and then performing a second grinding, to produce second precursor solution. In this embodiment, the third time period required for mixing and stirring is preferred to be 10 minutes, but not limited herein. In a preferred embodiment, in order to make the first precursor solution and the second quantity of the lithium compound and the compound containing metallic ions with valence equals to 2, 3, 4 or 5 completely reacted, the second grinding is implemented by a ball mill grinding at 350-750 rpm for 2-3 hours, thereby completing the second grinding so as to produce the second precursor solution.

Next, drying the second precursor solution, then as shown in step S106, calcining the second precursor solution to produce the lithium nickel manganese oxide cathode material of the battery. The formula of the lithium nickel manganese oxide cathode material of the battery is written by $Li_{1.0+x}Ni_{0.5}Mn_{1.5}M_yO_4$. M represents the metallic ions with valence equals to 2, 3, 4 or 5, x is greater than or equal to −0.1 and less than or equal to 0.1, and y is greater than 0 and less than or equal to 0.08. Moreover, the calcination is implemented by placing the preliminary-dried second precursor solution in a ceramic sintered vessel and maintaining at a temperature of 800° C. for 10 hours, so that a lithium nickel manganese oxide cathode material of a battery having high tap density and high charge capacity per unit weight is produced.

Figure 2:
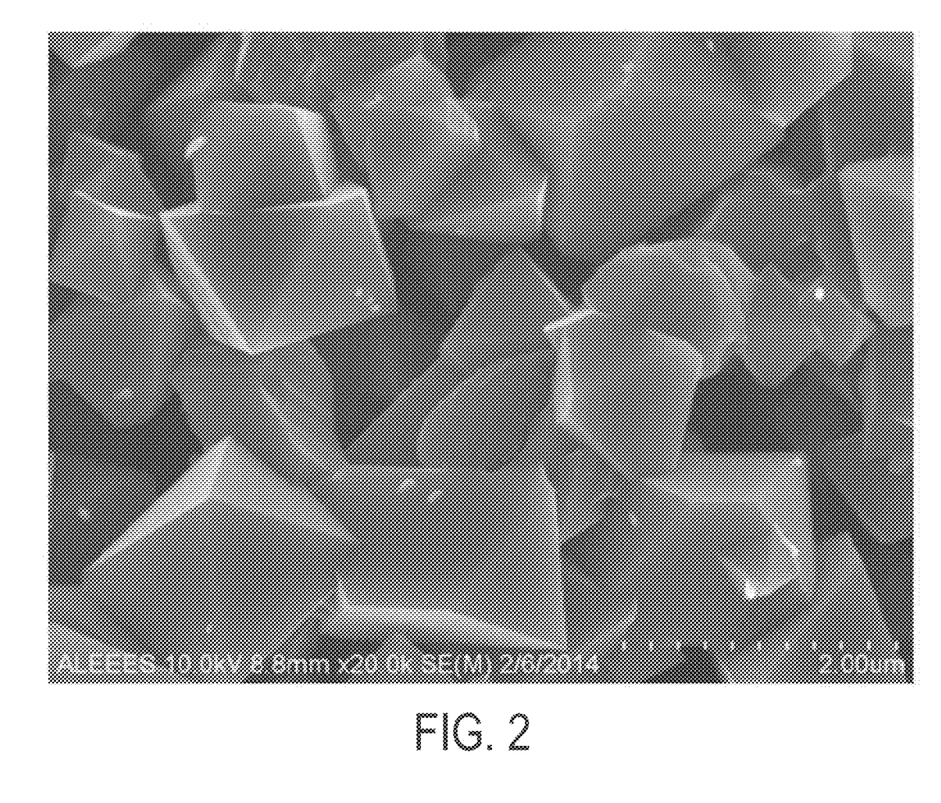
FIG. 2 schematically illustrates the SEM analysis diagram of primary particles of the product powder prepared by adding vanadium compound.
Figure 3:
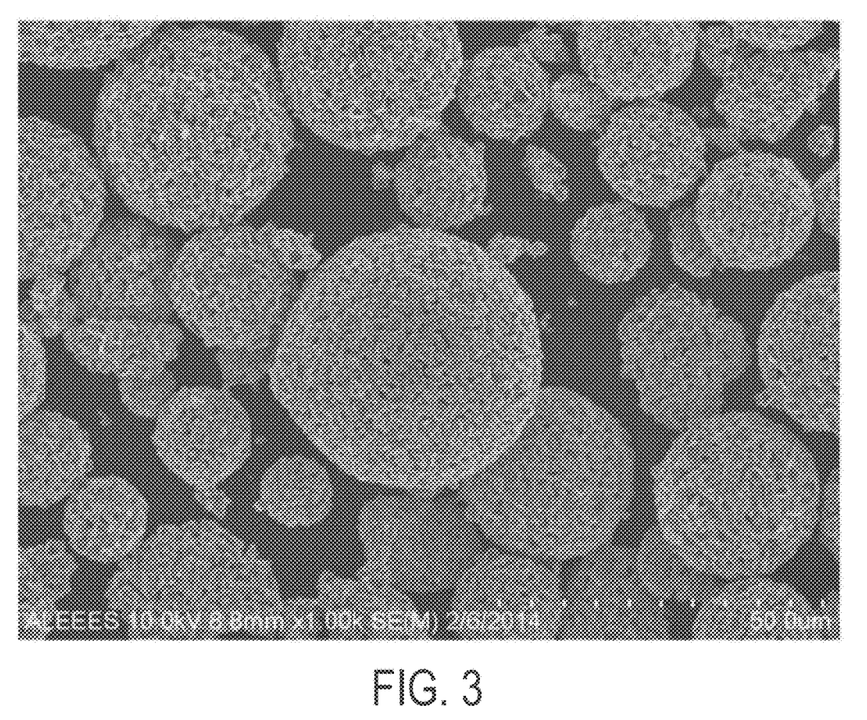
FIG. 3 schematically illustrates the SEM analysis diagram of secondary particles of the product powder prepared by adding vanadium compound.

Please refer to FIG. 2 and FIG. 3. FIG. 2 schematically illustrates the SEM (Scanning Electron Microscope) analysis diagram of primary particles of the product powder prepared by adding vanadium compound. FIG. 3 schematically illustrates the SEM analysis diagram of secondary particles of the product powder prepared by adding vanadium compound. In a preferred embodiment, the compound containing metallic ions with valence equals to 2, 3, 4 or 5 is a vanadium compound, the vanadium compound is added in the step S105, and the formula of the lithium nickel manganese oxide cathode material prepared in the step S106 is written by $Li_{1.0+x}Ni_{0.5}Mn_{1.5}V_yO_4$, x is greater than or equal to −0.1 and less than or equal to 0.1, and y is greater than 0 and less than or equal to 0.08. The surface exteriors are shown through SEM in FIG. 2 and FIG. 3. In this embodiment, as shown in FIG. 2, the primary particles of the cathode material, which is written by $Li_{1.0+x}Ni_{0.5}Mn_{1.5}V_yO_4$, of the battery are arranged as octahedral structures, thereby achieving the advantages of increasing the charge capacity per unit weight and the tap density.

Figure 4:
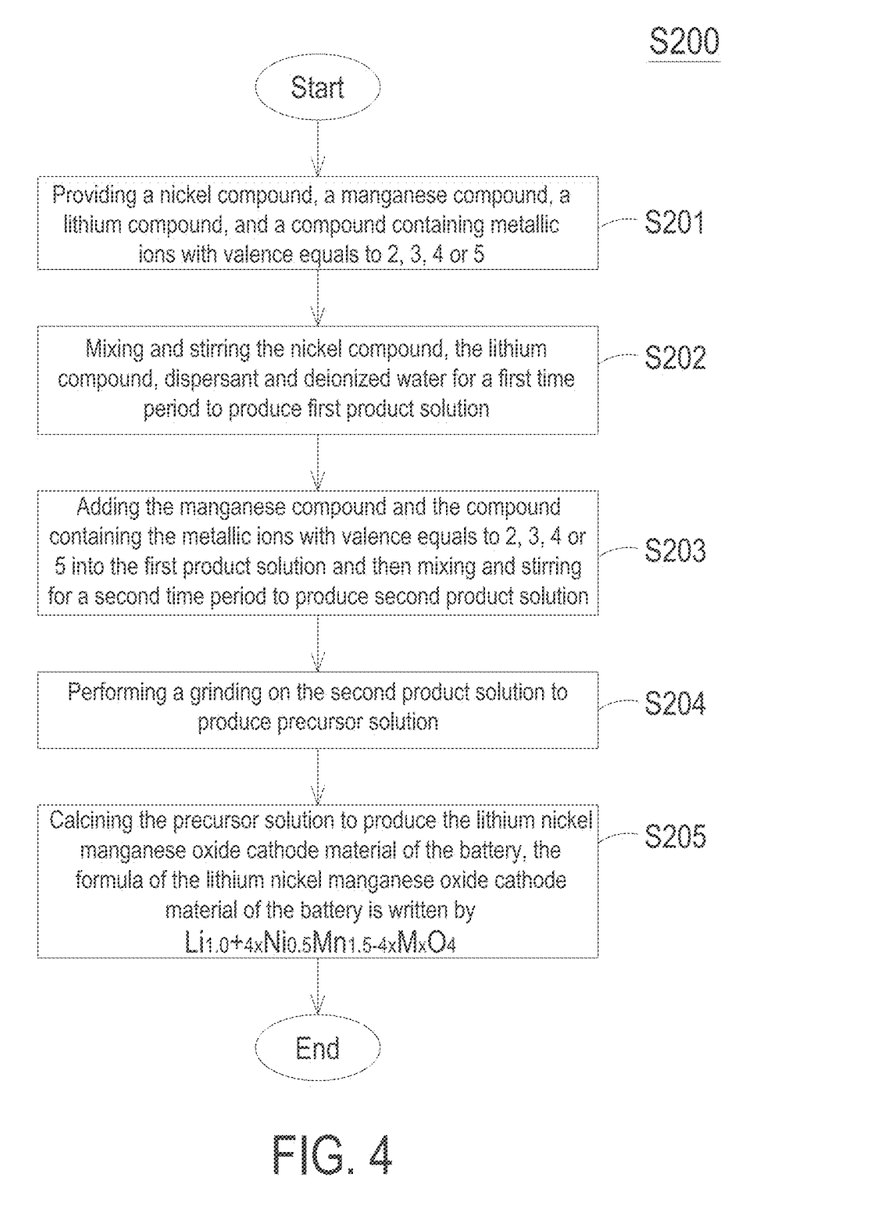
FIG. 4 schematically illustrates the flow chart of a second preparation method of a lithium nickel manganese oxide cathode material of a battery of the present invention.

Please refer to FIG. 4. FIG. 4 schematically illustrates the flow chart of a second preparation method of a lithium nickel manganese oxide cathode material of a battery of the present invention. As shown in FIG. 4, a second preparation method S200 of a lithium nickel manganese oxide cathode material of a battery of the present invention includes steps as follows. At first, as shown in step S201, providing a nickel compound, a manganese compound, a lithium compound, and a compound containing metallic ions with valence equals to 2, 3, 4 or 5. The compound containing metallic ions with valence equals to 2, 3, 4 or 5 is not limited to a vanadium compound, a niobium compound, a manganese compound or a antimony compound, and is preferred to be a vanadium compound.

Next, as shown in step S202, mixing and stirring the nickel compound, the lithium compound, dispersant and deionized water for a first time period to produce first product solution. Then, as shown in step S203, adding the manganese compound and the compound containing the metallic ions with valence equals to 2, 3, 4 or 5 into the first product solution and then mixing and stirring for a second time period to produce second product solution. Next, as shown in step S204, performing a grinding on the second product solution to produce precursor solution. Next, drying the precursor solution, and then as shown in step S205, calcining the precursor solution to produce the lithium nickel manganese oxide cathode material of the battery. The formula of the lithium nickel manganese oxide cathode material of the battery is written by $Li_{1.0+4x}Ni_{0.5}Mn_{1.5-4x}M_xO_4$. M represents the metallic ions with valence equals to 2, 3, 4 or 5, and x is greater than 0 and less than or equal to 0.1.

The nickel compound, the lithium compound, the manganese compound and the compound containing the metallic ions with valence equals to 2, 3, 4 or 5 selected by the second preparation method S200 are as same as those selected by the first preparation method S100, and are not redundantly described herein. In addition, the first time period described in the step S202, the second time period described in the step S203 and the calcination described in the step S205 are as same as those described in the first preparation method S100, and are not redundantly described herein. Moreover, the grinding of the step S204 is implemented through putting the second product solution in a ball mill for grinding at 350-450 rpm for 2-3 hours, thereby completing the grinding to produce the precursor solution.

Similarly, in the second preparation method S200, the compound containing the metallic ions with valence equals to 2, 3, 4 or 5 is preferred to be a vanadium compound, the vanadium compound is added in the step S203, and the formula of the lithium nickel manganese oxide cathode material prepared in the step S205 is written by $Li_{1.0+4x}Ni_{0.5}Mn_{1.5-4x}V_xO_4$, V represents vanadium ions, x is greater than or equal to 0 and less than or equal to 0.1. The surface exteriors shown through SEM are similar with the surface exteriors shown in FIG. 2 and FIG. 3, and are octahedral structures, so that the lithium nickel manganese oxide cathode material of a battery prepared by the second preparation method S200 also achieves the advantages of increasing the charge capacity per unit weight and the tap density.

Figure 5:
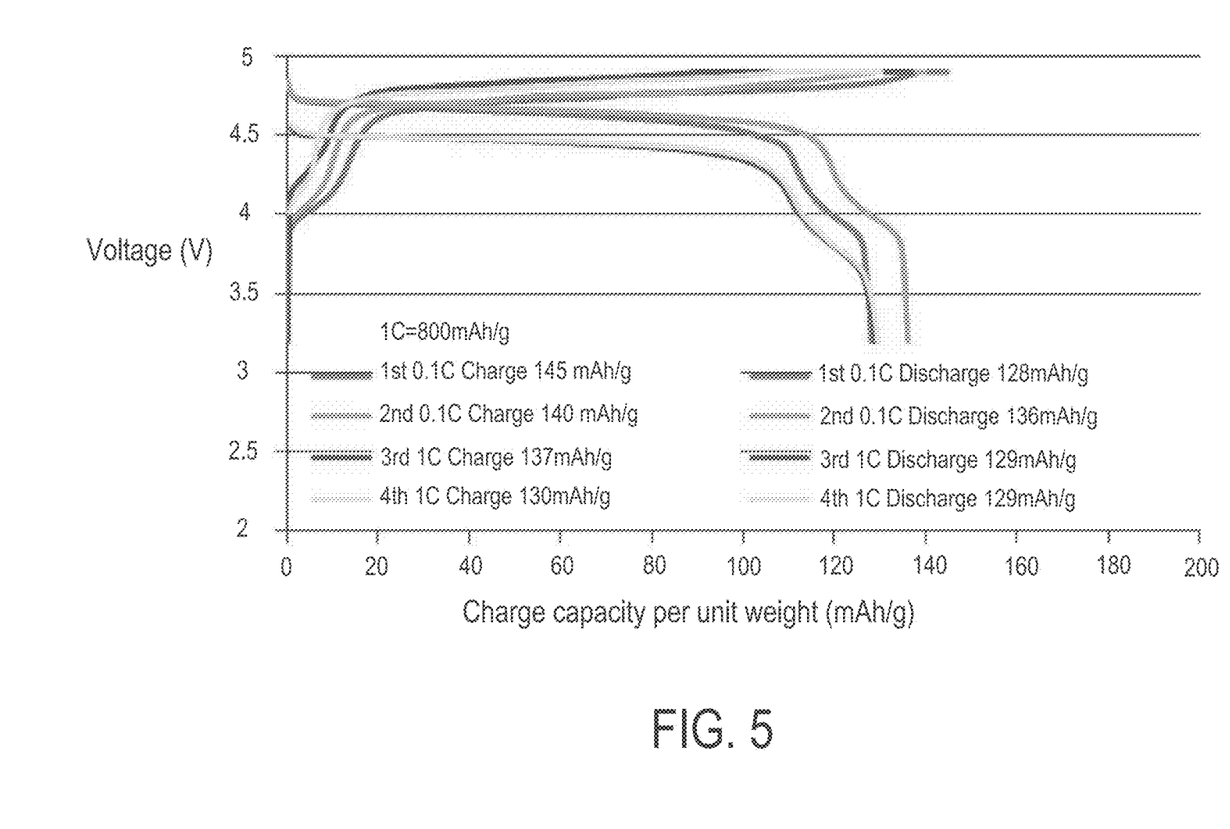
FIG. 5 schematically illustrates the charging and discharging characteristic diagram of a cell battery made of the product powder prepared by adding vanadium compound into the first preparation method or the second preparation method of the present invention.
Figure 6:
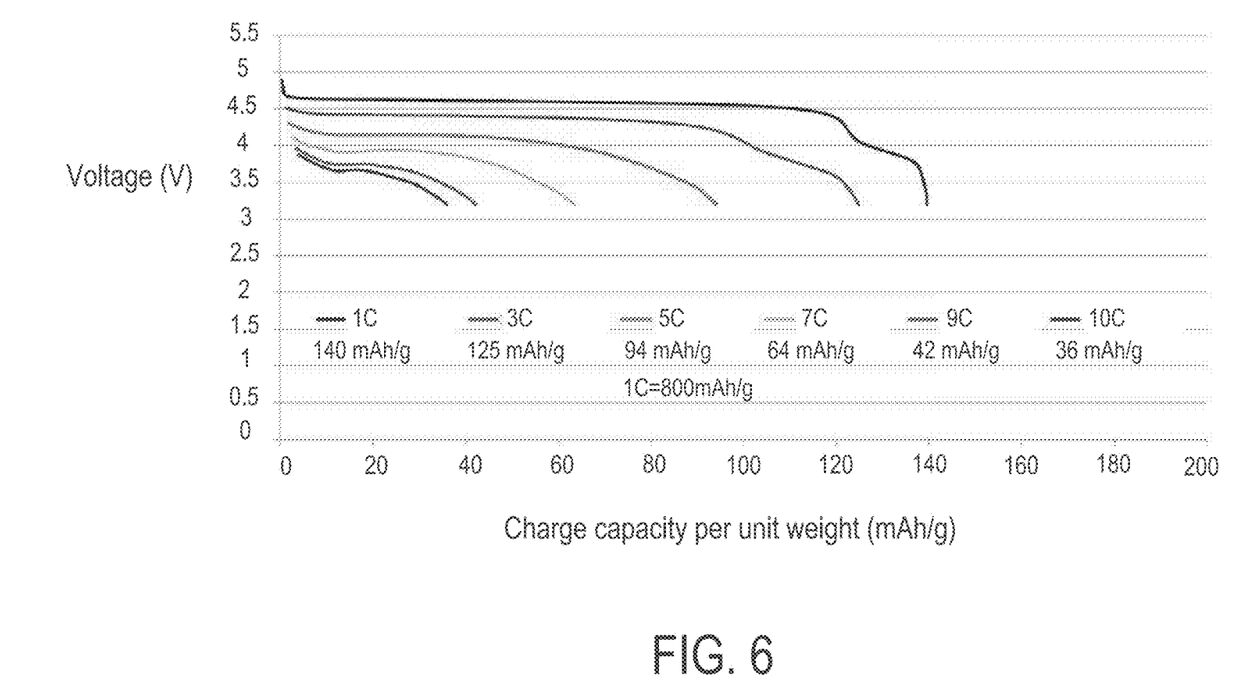
FIG. 6 schematically illustrates the charging and discharging rates diagram of the cell battery made of the product powder prepared by adding vanadium compound into the first preparation method or the second preparation method.

Please refer to FIG. 5 and FIG. 6. FIG. 5 schematically illustrates the charging and discharging characteristic diagram of a cell battery made of the product powder prepared by adding vanadium compound into the first preparation method or the second preparation method of the present invention. FIG. 6 schematically illustrates the charging and discharging rates diagram of the cell battery made of the product powder prepared by adding vanadium compound into the first preparation method or the second preparation method. The product powder of the lithium nickel manganese oxide cathode material added with the vanadium compound prepared through the first preparation method S100 or the second preparation method S200 are coated on an aluminum substrate and then assembled as a coin cell (model type: 2032). The coil cell is tested by a charging and discharging machine to charge and discharge at 0.1 coulomb for two cycles and charge and discharge at 2 coulombs for two cycles. The range of testing voltage is between 3.2 and 4.9 volts. The test result is shown in FIG. 5. The charging and discharging rate (i.e. C-rate) of the coin cell is then tested by the charging and discharging machine through a 0.5C charge and 1C, 3C, 5C, 7C, 9C and 10C discharges, among which C is the capacity of the coin cell (e.g. C=800 mAh, 1C charge rate means the charging current is 800 mAh), and the test result is shown in FIG. 6. Therefore, since the lithium nickel manganese oxide cathode material prepared through the first preparation method S100 or the second preparation method S200 has good electric characteristics, the charge capacity per unit weight provided by the lithium nickel manganese oxide cathode material of the present invention is greater than the charge capacity per unit weight provided by the lithium nickel manganese oxide cathode material of prior art.

Figure 7:
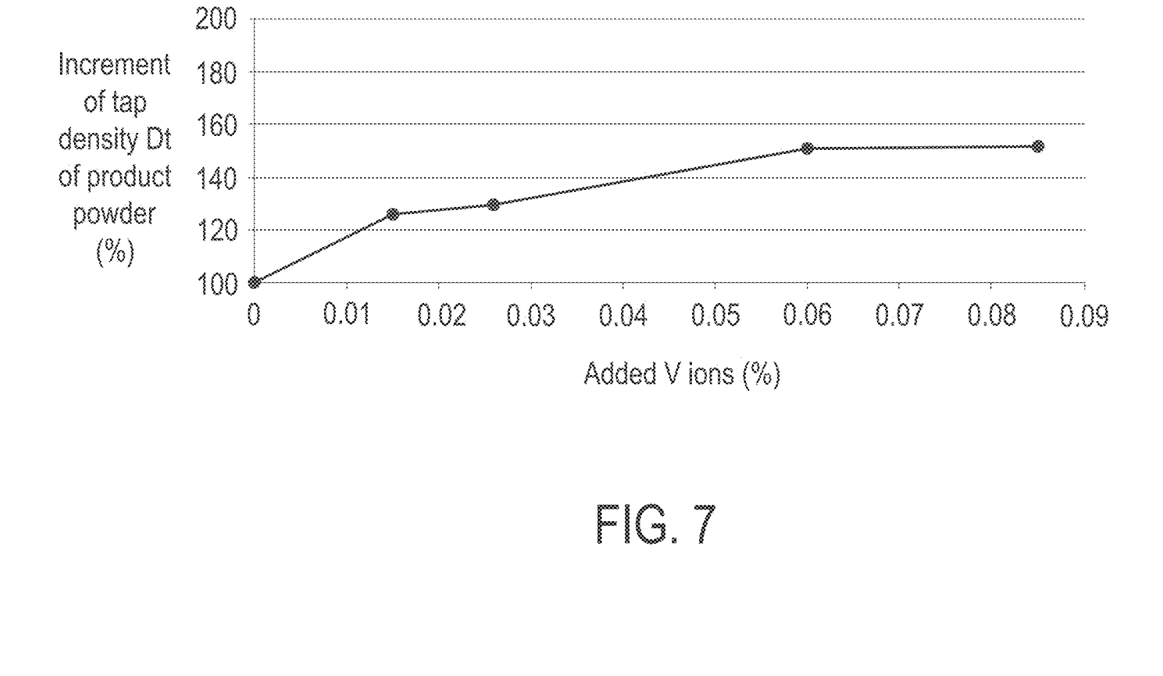
FIG. 7 schematically illustrates the diagram indicating the relation between the increment of tap density Dt of product powder prepared by adding vanadium compound into the first preparation method or the second preparation method and the percentage of added vanadium ions.

Please refer to FIG. 7. FIG. 7 schematically illustrates the diagram indicating the relation between the increment of tap density Dt of product powder prepared by adding vanadium compound into the first preparation method or the second preparation method and the percentage of added vanadium ions. The tap densities of the lithium nickel manganese oxide cathode material prepared through the first preparation method S100 or the second preparation method S200 are tested with different percentages of the added vanadium ions, and the test result is shown in FIG. 7. As shown in FIG. 7, with increasing of percentage of the added vanadium ions, the tap density of the product powder prepared by the present invention are also increased about 25-50 percent.

Figure 8:
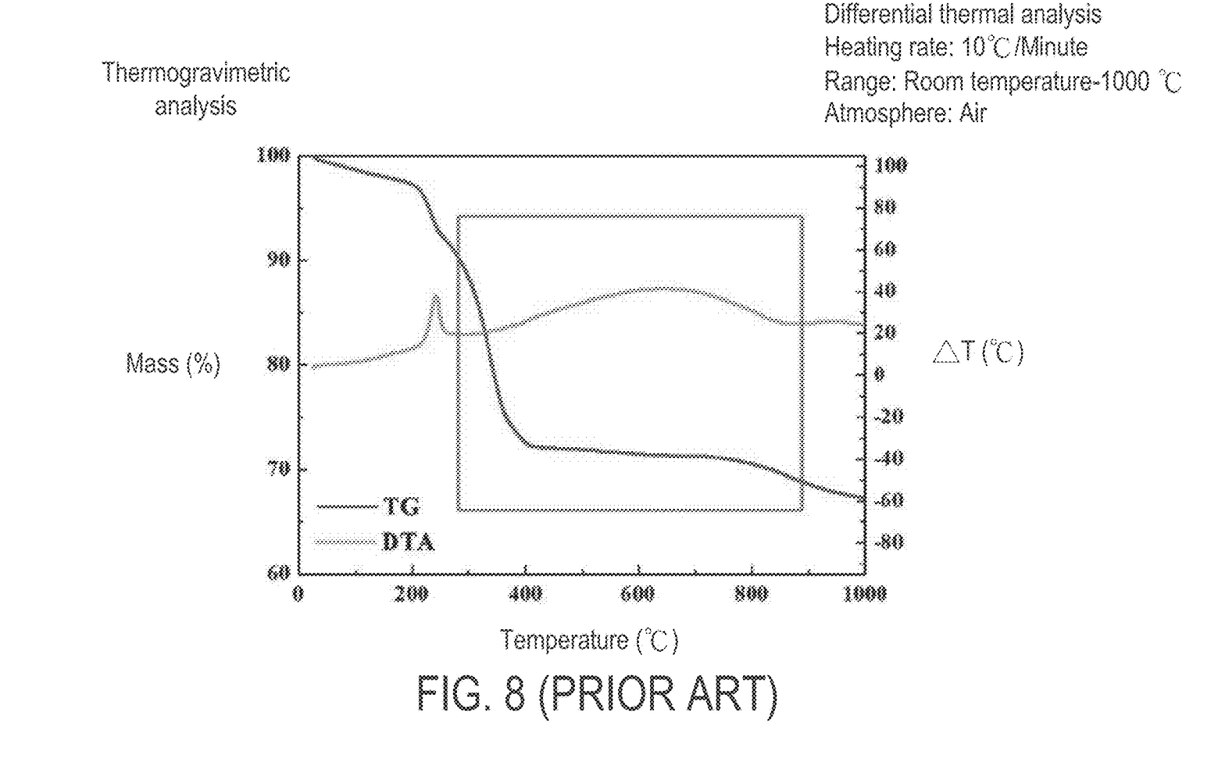
FIG. 8 schematically illustrates the thermogravimetric analysis and the differential thermal analysis diagram of the product powder of the lithium nickel manganese oxide cathode material of a battery of prior art.
Figure 9:
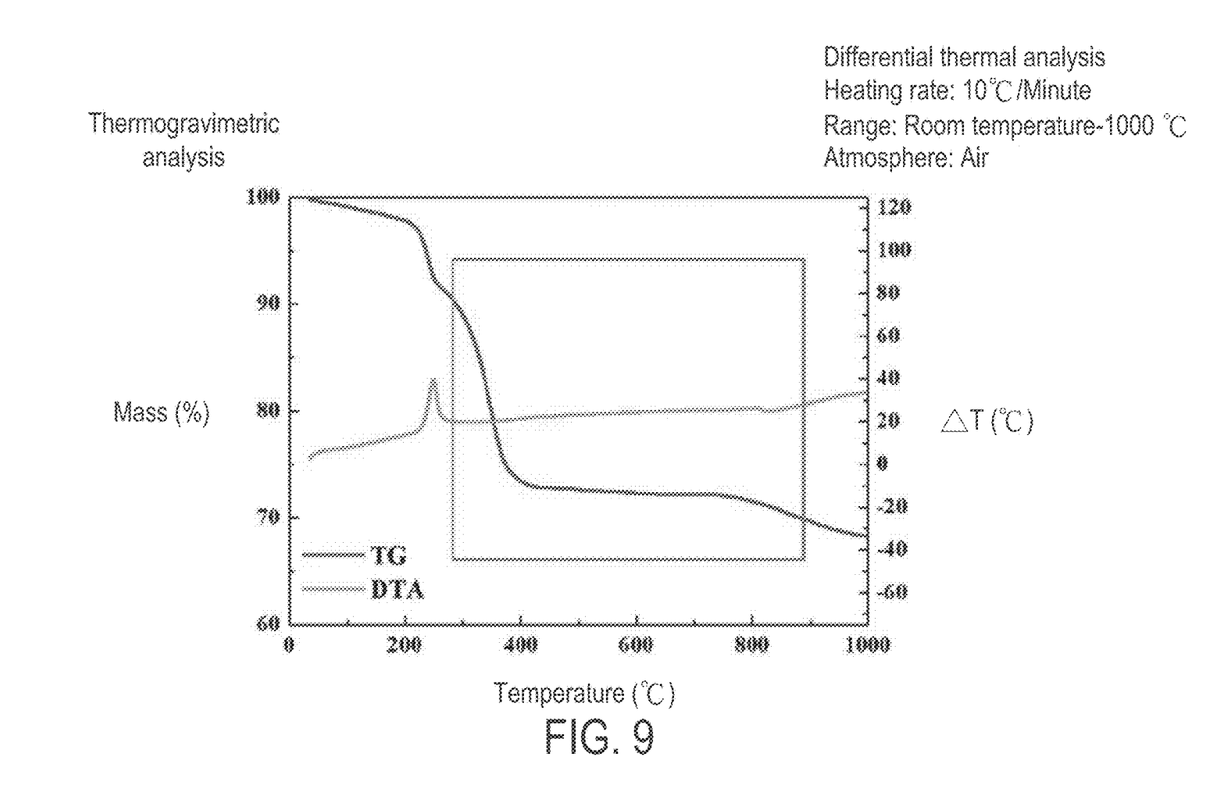
FIG. 9 schematically illustrates the thermogravimetric analysis and the differential thermal analysis diagram of the product powder prepared by adding vanadium compound into the first preparation method or the second preparation method.

Please refer to FIG. 8 and FIG. 9. FIG. 8 schematically illustrates the thermogravimetric analysis and the differential thermal analysis diagram of the product powder of the lithium nickel manganese oxide cathode material of a battery of prior art. FIG. 9 schematically illustrates the thermogravimetric analysis and the differential thermal analysis diagram of the product powder prepared by adding vanadium compound into the first preparation method or the second preparation method. The product powder of the lithium nickel manganese oxide cathode material prepared by the manners of prior art are analyzed through the thermogravimetric analysis (i.e. TG) and the differential thermal analysis (i.e. DTA), and the analysis result is shown in FIG. 8. The product powder of the lithium nickel manganese oxide cathode material added with the vanadium compound prepared through the first preparation method S100 or the second preparation method S200 are analyzed through the thermogravimetric analysis and the differential thermal analysis, and the analysis result is shown in FIG. 9. As shown in FIG. 8 and FIG. 9, it can be easily known that the activation energy of reaction required to be provided in the thermal treatment stage of the preparation method of the present invention is obviously lower than the activation energy of reaction required to be provided in the thermal treatment stage of the preparation manner of prior art. That is, the activation energy of reaction can be reduced in the thermal treatment stage while preparing the lithium nickel manganese oxide compound through a solid-state reaction.

From the above description, the present invention provides a preparation method of a lithium nickel manganese oxide cathode material of a battery and a lithium nickel manganese oxide cathode material of a battery to solve the problems of lower tap density and lower charge capacity per unit weight of a lithium battery made of a lithium nickel manganese oxide compound prepared by a solid-state reaction of prior art. By adding a compound containing metallic ions with valence equals to 2, 3, 4 or 5 into a solid-state reaction to produce primary particles, which are product powders having octahedral structures, the charge capacity per unit weight and the tap density of the lithium nickel manganese oxide cathode material of the battery can be increased, and the activation energy of reaction can be reduced in the thermal treatment stage while preparing the lithium nickel manganese oxide compound through a solid-state reaction. Therefore, the total electricity per unit volume of the battery is increased, the use time of the electronic products and the electricity-driven transports are lengthened.

It is intended to cover various modifications and similar arrangements included within the spirit and scope of the appended claims, which are to be accorded with the broadest interpretation so as to encompass all such modifications and similar structures.

What is claimed is:

1. A preparation method of a lithium nickel manganese oxide cathode material of a battery, comprising steps of:
   (a) providing a nickel compound, a manganese compound, a first quantity of lithium compound, a second quantity of lithium compound, and a compound containing metallic ions with valence equals to 2, 3, 4 or 5;
   (b) mixing and stirring the nickel compound, the first quantity of lithium compound, dispersant and deionized water for a first time period to produce first product solution;
   (c) adding the manganese compound into the first product solution and then mixing and stirring for a second time period to produce second product solution;
   (d) performing a first grinding on the second product solution to produce first precursor solution;
   (e) mixing and stirring the second quantity of lithium compound, the compound containing the metallic ions with valence equals to 2, 3, 4 or 5, and the first precursor solution for a third time period, and then performing a second grinding, to produce second precursor solution; and
   (f) calcining the second precursor solution to produce the lithium nickel manganese oxide cathode material of the battery, wherein the formula of the lithium nickel manganese oxide cathode material of the battery is written by $Li_{1.0+x}Ni_{0.5}Mn_{1.5}M_yO_4$, and wherein M represents the metallic ions with valence equals to 2, 3, 4 or 5, x is greater than or equal to −0.1 and less than or equal to 0.1, and y is greater than 0 and less than or equal to 0.08.

2. The preparation method according to claim 1, wherein the nickel compound is selected from the group consisting of NiO and $NiCO_3$.

3. The preparation method according to claim 1, wherein the manganese compound is selected from the group consisting of $Mn_2O_3$, MnO, $MnCO_3$ and $Mn_2(CO_3)_3$.

4. The preparation method according to claim 1, wherein each of the first quantity of lithium compound and the second quantity of lithium compound is selected from the group consisting of LiOH and $Li_2CO_3$, and the first quantity of lithium compound and the second quantity of lithium compound are the same compound or different compounds.

5. The preparation method according to claim 1, wherein the metallic ions with valence equals to 2, 3, 4 or 5 are selected from the group consisting of $Mn_2O_3$, MnO, $MnCO_3$, $Mn_2(CO_3)_3$ and $V_2O_5$.

6. The preparation method according to claim 1, wherein each of the first time period, the second time period and the third time period is 10 minutes.

7. The preparation method according to claim 1, wherein the first grinding is implemented by a ball mill grinding at 450-650 rpm for 2-3 hours.

8. The preparation method according to claim 1, wherein the second grinding is implemented by a ball mill grinding at 350-750 rpm for 2-3 hours.

* * * * *